US012459869B2

(12) United States Patent
Roesler et al.

(10) Patent No.: US 12,459,869 B2
(45) Date of Patent: Nov. 4, 2025

(54) MANUFACTURE OF GREEN COMPACTS FROM Na-β-ALUMINATE

(71) Applicants: FRAUNHOFER-GESELLSCHAFT ZUR FOERDERUNG DER ANGEWANDTEN FORSCHUNG E.V., Munich (DE); Rösler Ceraminno GmbH, Tettau-Schauberg (DE)

(72) Inventors: Johannes Roesler, Tettau/Schauberg (DE); Cornelius Dirksen, Hermsdorf (DE); Matthias Schulz, Hermsdorf (DE); Roland Weidl, Hermsdorf (DE)

(73) Assignees: FRAUNHOFER-GESELLSCHAFT ZUR FOERDERUNG DER ANGEWANDTEN FORSCHUNG E.V., Munich (DE); RÖSLER CERAMINNO GMBH, Tettau-Schauberg (DE)

( * ) Notice: Subject to any disclaimer, the term of this patent is extended or adjusted under 35 U.S.C. 154(b) by 832 days.

(21) Appl. No.: 17/771,516

(22) PCT Filed: Nov. 2, 2020

(86) PCT No.: PCT/EP2020/080680
§ 371 (c)(1),
(2) Date: Apr. 25, 2022

(87) PCT Pub. No.: WO2021/089481
PCT Pub. Date: May 14, 2021

(65) Prior Publication Data
US 2023/0142056 A1 May 11, 2023

(30) Foreign Application Priority Data
Nov. 6, 2019 (DE) ...................... 10 2019 129 869.5

(51) Int. Cl.
C04B 35/44 (2006.01)
C04B 35/63 (2006.01)
C04B 35/632 (2006.01)
H01M 10/39 (2006.01)

(52) U.S. Cl.
CPC .......... *C04B 35/44* (2013.01); *C04B 35/6303* (2013.01); *C04B 35/632* (2013.01); *H01M 10/39* (2013.01); *C04B 2235/3222* (2013.01); *C04B 2235/602* (2013.01); *C04B 2235/6027* (2013.01); *H01M 2300/0068* (2013.01)

(58) Field of Classification Search
CPC ........................ C04B 35/44; C04B 2235/6027
See application file for complete search history.

(56) References Cited

U.S. PATENT DOCUMENTS 4,021,255 A 5/1977 Chiku et al.
4,338,272 A * 7/1982 Pelton .................... B28B 1/262
264/225

5,672,554 A * 9/1997 Mohri ....................... C01F 7/02
501/153
2016/0221242 A1 8/2016 Durr et al.
2018/0048029 A1 2/2018 Schilm et al.

FOREIGN PATENT DOCUMENTS

| AT | 265097 B | 9/1968 | |
| CN | 104339438 A | 2/2015 | |
| CN | 105517974 A | 4/2016 | |
| DE | 10115818 A1 | 10/2002 | |
| DE | 102015204465 A1 | 9/2016 | |
| DE | 102016120941 A1 | 5/2018 | |
| EP | 0440874 A2 * | 8/1991 | ............. B28B 1/263 |
| GB | 1113629 A | 5/1968 | |
| GB | 2281561 A | 3/1995 | |
| JP | S5038710 A | 4/1975 | |
| JP | H06190809 A | 7/1994 | |
| JP | H06238631 A | 8/1994 | |
| JP | H10182220 A | 7/1998 | |
| JP | H10309711 A | 11/1998 | |
| JP | 2004284879 A | 10/2004 | |
| JP | 2012106387 A | 6/2012 | |
| KR | 101404044 B1 | 6/2014 | |

OTHER PUBLICATIONS

Rowley. U.S. Department of Energy Journal of Undergraduate Research. Jan. 2002. p. 71-74 (Year: 2002).*
Haerle. Journal of Materials'science 28 (1993) 5679-5683 (Year: 1993).*
Stevens. Review Structure, properties and production of B-alumina. Journal of Materials'science 19 (1984) 695-715 (Year: 1984).*
International Search Report and Written Opinion (with English translation of International Search Report) issued in corresponding International Patent Application No. PCT/EP2020/080680 mailed Feb. 10, 2021 (9 pages).
Search Report issued in corresponding German Patent Application No. 10 2019 129 869.5 dated Jul. 20, 2020 (8 pages).
Virkar, "A High Temperature Electrochemical Energy Storage System Based on Sodium Beta-Alumina Solid Electrolyte (BASE)," Mar. 31, 2008, DOE Report, DOI: 10.2172/935426 (52 pages).
Mali et al., "Fabrication of a thin walled beta-alumina electrolyte cells," Journal of Power Sources, Feb. 4, 2011, vol. 196, No. 11, pp. 5191-5196.
Byckalo et al., "Slip Casting of Beta-Al2O3 for Alkali Probes in Molten Metals," Ceramic Bulletin, vol. 55, No. 8, Mar. 1971, pp. 286-288.

(Continued)

*Primary Examiner* — Matthew E. Hoban
(74) *Attorney, Agent, or Firm* — Kilyk & Bowersox, P.L.L.C.

(57) ABSTRACT

The invention relates to a method for manufacturing of a sinterable green body from sodium-β-aluminate- and/or precursor-particles bonded via binders by means of slip casting, wherein a castable slip containing the particles as well as dispersants and binders is introduced into a casting mold and, after solidification, is demolded as a green body.

19 Claims, No Drawings

(56) References Cited

OTHER PUBLICATIONS

Office Action issued in corresponding Chinese Patent Application No. 202080076932.8 dated Jul. 24, 2023 (with English translation) (16 pages).
Dequn Li, et al., "China Die & Mould Design Canon," Light Industry Mould Design, Jan. 31, 2003, vol. 2, Jiangxi Science and Technology Press, pp. 1601-1602 (5 pages).
Office Action issued in corresponding Chinese Patent Application No. 202080076932.8 dated Nov. 23, 2022 (21 pages).
Office Action issued in corresponding Japanese Patent Application No. 2022-525581 dated Feb. 2, 2024 (with English translation) (11 pages).

\* cited by examiner

MANUFACTURE OF GREEN COMPACTS FROM Na-β-ALUMINATE

This application is a National Stage Application of PCT/EP2020/080680, filed Nov. 2, 2020, which claims priority to German Patent Application No. 10 2019 129 869.5, filed Nov. 6, 2019.

TECHNICAL FIELD OF THE INVENTION

The invention relates to the manufacturing of green bodies from Na-β-Aluminate.

BACKGROUND

Due to their ability to conduct sodium ions, Na-β-Aluminate-ceramics are used, for example, in high-temperature-batteries of the Na/S or NaNiCl$_2$ types and in AMTEC generators. In these applications, closed on one side ceramic tubes made of Na-β-aluminate with an internal volume of about 200 to 500 cm$^3$ are required.

In the state of the art, the green bodies for these ceramic tubes are produced industrially by granulation of ceramic starting materials by preparing a ceramic suspension (slip), granulation by e.g. spray drying and isostatic pressing. This discontinuous technology requires high investments for sufficiently large presses. The ceramic particles must also be elaborately granulated and mixed with suitable binders before processing.

The simple and inexpensive ceramic technology of slip casting has not yet been applied to Na-β-aluminate, at least on an industrial scale, which is mainly due to the poor durability of standard plaster molds compared to basic Na-β-aluminate slips. Standard porous plastic molds cannot be used either, since their pores either clog completely after only a few applications or do not adequately retain the Na-β-aluminate particles.

Apart from the issue of the casting mold material, Na-β-aluminate is also difficult to process into a castable aqueous slip. Because of these problems, the low-cost method of slip casting has not yet been applied to Na-β-aluminate.

In view of the above-mentioned problems, the use of organic solvents instead of water was considered in the prior art for the production of a castable slip from Na-β-aluminate with a high solids content. Another way of producing aqueous slips from Na-β-aluminate is to lower the pH in the slip by means of acid, thus improving the suspending properties of the composition. Neither approach is practical for production for reasons of fire safety, economy and environmental protection.

For the production of molds that allow casting of green bodies from Na-β-aluminate, the prior art mentions the use of a powder bulk that can be used only once. U.S. Pat. No. 4,338,272 A can be cited as an example of this. However, due to the lack of possibility to recycle the mold, this proposed solution is unsuitable for industrial production.

KR 101 404 044 B1 discloses a method in which an Al$_2$O$_3$ body is first produced by slip casting, which is then infiltrated with sodium compounds and sintered.

TECHNICAL OBJECT

Against this background, it is an object of the present invention to provide a method for manufacturing of green bodies from Na-β-Aluminate, including slips and casting molds suitable for this purpose, which overcomes the disadvantages mentioned.

GENERAL DESCRIPTION OF THE INVENTION

Against this background, the invention relates to a method for the manufacturing of a sinterable green body from sodium-β-aluminate- and/or precursor-particles bonded via binders by means of slip casting, wherein a castable slip, containing the particles as well as dispersants and binders, is introduced into a casting mold and, after solidification, is demolded as a green body. According to the invention, it is provided that the slip is an aqueous suspension and/or that the casting mold consists of aggregate particles bonded with organic and/or inorganic binders.

The idealized formula of sodium-β-aluminate is NaAl$_{11}$O$_{17}$. But crystals typically contain more sodium than indicated by this formula, which is compensated for by aluminum vacancies, resulting in a real composition of Na$_{1.0-2.0}$Al$_{10-12}$O$_{17}$ or, in many cases, Na$_{1.3}$Al$_{10.9}$O$_{17}$. This desired modification, the sodium-β"-aluminate, can be present either in pure form or in a form stabilized by incorporation of, for example, lithium or magnesium ions into the crystal structure, whereby in the latter case real compositions of Na$_{1.0-2.0}$Al$_{10-12}$Li$_{0.1-1.0}$O$_{17}$ and/or Na$_{1.0-2.0}$Al$_{10-12}$Mg$_{0.1-1.5}$O$_{17}$ can result.

In one variant of the invention, in place of the unstabilized or stabilized Na-β-aluminate particles or in addition to these particles, particles of precursor substances such as sodium carbonate (Na$_2$CO$_3$) and/or sodium hydroxide (NaOH) as well as aluminum oxide (Al$_2$O$_3$) and/or aluminum hydroxide (Al(OH)$_3$) can be suspended, in order to completely or partially replace the mass fraction of the Na-β-aluminate particles.

Preferably, the Na-β-aluminate- and/or precursor-particles of the slip have a size distribution with a median grain size (d$_{50}$-value) of less than 10 μm. These particle sizes have proven to be advantageous with respect to the slip properties as well as the properties of the resulting green body.

As far as the composition of the slip is concerned, it may comprise 30-95 wt. % and preferably 50-85 wt. % of the Na-β-aluminate- and/or precursor-particles, 10-60 wt. % and preferably 25-45 wt. % of water and up to 30 wt. %, preferably up to 20 wt. % of other constituents in the form of dispersants, organic binders and optionally further auxiliaries. The proportion of other auxiliaries is preferably at most 10 wt. % and further preferably at most 5 wt. %. The proportions of the above constituents add up to 100 wt. %.

The dispersants of the slip may comprise or consist of organic dispersants, such as carboxylic acids or other organic surfactants. The binders of the slip may comprise or consist of organic binders such as (poly)saccharides, PVA or carboxylic acids. Furthermore, the slip may also comprise metal oxides such as nickel oxide, titanium oxide, manganese oxide, chromium oxide, zirconium oxide, lithium oxide or magnesium oxide.

Preferably, the slip is free of organic solvents and/or free of acid. This improves economy and environmental friendliness.

The slip can be prepared in an upstream process step by mixing Na-β-aluminate- and/or precursor-particles with the water and the dispersants and binders. During or after mixing, the slip is thereby preferably deaerated by applying a vacuum. The application of a vacuum during or after mixing avoids subsequent bubble formation in the green body. Mixing of the Na-β-aluminate- and/or precursor-particles with the water and the dispersants and binders can be carried out in a mill, so that the particles are simultaneously comminuted during mixing. For example, mixing can take place in a drum mill.

In one embodiment, the material of the casting mold has 50-99 wt. % and preferably 70-90 wt. % of aggregate particles and at least one inorganic or organic binder. The proportion of the inorganic binder can be up to 50 wt. % and preferably up to 30 wt. %. The proportion of the organic binder may be up to 20 wt. % and preferably up to 15 wt. %. Furthermore, up to 10 wt. % and preferably up to 5 wt. % of auxiliaries and additives may be present. The proportions of the above constituents add up to 100 wt. %. In a preferred variant, a mixture of organic and inorganic binders can be used as the binder.

The aggregate particles of the casting mold may be, for example, particles of polyethylene glycol, titanium oxide, aluminum oxide, sodium aluminate or silicate or mixtures thereof. Suitable inorganic binders for bonding the aggregate particles in the casting mold include cementitious mixtures containing lime. Suitable organic binders for bonding the aggregate particles in the casting mold include epoxy-, phenolic- or polyester-resins and glues.

In one embodiment of the process, the residence time of the slip in the casting mold is between 5 and 20 minutes. During the dwell time in the casting mold, the slip can be pressurized in the casting mold. During the dwell time, at least partial drying and solidification takes place. If necessary, additional slip is added during the dwell time to keep the level of the mold constant. The pressure of, for example, 2-5 atmospheres can be applied, for example, by applying an air or gas pressure or via a liquid column opening into the cavity of the mold, whereby the latter can also be filled with the slip itself and, in a dual function, also serve to supplement the shrinking volume. After a dwell time in the casting mold or after its demolding, the green body is typically additionally dried, this additional drying preferably taking place under normal pressure.

With regard to the applications described at the beginning, it is preferred that the green body is a hollow body closed on one side, preferably in the form of a tube, hollow cylinder or funnel closed on one side. The internal volume of the hollow body can be, for example, between 50 and 1500 cm$^3$ and preferably between 200 to 500 cm$^3$. The wall thickness is preferably 1-4 mm, which can be useful for sintering as well as for later use.

The invention further relates to a method for manufacturing a ceramic molded body from sintered sodium-β-aluminate-particles, the method comprising manufacturing a green body according to a method described above and subsequently firing said green body. The sodium-β-aluminate- and/or precursor-particles of the green body are sintered during the firing and the binder is melted out or outgassed during the heating.

Sintering can be pressureless or pressurized. Apart from possible shrinkage during sintering, the sintered body has a shape corresponding to the green body. The size of the green body can be adjusted so that, after possible shrinkage, ultimately the internal volume of the hollow molded body is between 50 and 1500 cm$^3$ or between 200 and 500 cm$^3$.

Furthermore, the invention relates to a method for manufacturing a sodium-high-temperature-battery with a ceramic electrolyte, the method comprising manufacturing a ceramic molded body according to the method described above and using this molded body as ceramic electrolyte. The molded body serves as a solid electrolyte. Examples of sodium-high-temperature-batteries that can be manufactured by the method include high-temperature-batteries of the Na/S or NaNiCl$_2$ types and in AMTEC generators.

Working Example

Further details and advantages of the invention will be apparent from the embodiment described below.

The Na-β-Aluminate-Slip:

To manufacture the Na-β-aluminate-slip, Na-β-aluminate-particles, water and auxiliaries, namely metal oxides, an organic binder and an organic dispersant are added to a drum mill to mix and simultaneously grind the particles. The mill is operated until a homogeneous suspension is obtained and the d$_{50}$ of the Na-β-aluminate-particles is about 1 μm. After mixing, the slip is deaerated by applying a vacuum to avoid the formation of bubbles in the ceramic later.

The Casting Mold:

To manufacture the casting mold, a pourable mixture of structuring Al$_2$O$_3$-particles (aggregates), binders and water is deaerated under vacuum and then poured into a negative of the casting mold to be manufactured. After partial setting and drying of the mixture, the casting mold is removed from the negative and dried further.

The Manufacturing of the Green Body:

To manufacture a ceramic green body using the described slip and casting mold, the procedure is as follows.

In a first step, the slip is filled into the casting mold. It remains there for a defined time, during which time pressure is exerted on the slip via a liquid column which opens into the cavity of the mold and is also filled with the slip itself. In addition, the liquid column serves as a reservoir to fill in additional suspension during the dwell time and to compensate for the sinking level of the mold. The slip that is not required for the formation of shards is removed after the dwell time. The green body remaining in the cavity of the mold is dried in the casting mold for 12 hours and then removed.

Firing of the green body is then carried out at temperatures of 1500° C.-1600° C.

According to the invention, Na-β-aluminate can be processed aqueous to a slip and cast in a suitable and reusable casting mold. The applicability of slip casting results in cost savings compared to known methods based on isostatic pressing.

The invention claimed is:

1. A method for manufacturing sinterable green bodies from sodium-β-aluminate- and/or precursor-particles bonded via binders, said method comprising:

providing a casting mold formed from aggregate particles bonded with organic and/or inorganic binders, wherein the casting mold is provided by pouring a pourable mixture comprising the aggregate particles and the organic and/or inorganic binders into a negative of the casting mold and, after a partial setting and drying of the pourable mixture, removing the casting mold from the negative and drying it further;

introducing a castable slip containing the sodium-β-aluminate- and/or precursor-particles as well as dispersants and binders into the casting mold and, after solidification, demolding it as a sinterable green body; and reusing the casting mold, wherein the castable slip is an aqueous suspension, the aggregate particles are particles of polyethylene glycol, titanium oxide, aluminum oxide, sodium aluminate or silicate, or mixtures thereof, the inorganic binders are cementitious mixtures containing lime, and the organic binders are selected from epoxy, phenolic, or polyester resins.

2. The method according to claim 1, wherein the Na-β-aluminate- and/or precursor-particles of the castable slip have a size distribution with a median-grain-size (d$_{50}$-value) of below 10 μm.

3. The method according to claim 1, wherein the castable slip comprises 30-95 wt. % of the Na-β-aluminate- and/or precursor-particles, 10-60 wt. % of water and up to 30 wt. % of other constituents in the form of the dispersants, organic binders and optionally further auxiliaries.

4. The method according to claim 1, wherein the dispersants of the castable slip comprises of organic dispersants comprising carboxylic acids or other organic surfactants.

5. The method according to claim 1, wherein the binders in the castable slip comprise of organic binders.

6. The method according to claim 1, wherein the castable slip is free of organic solvents and/or free of acid.

7. The method according to claim 1, wherein the castable slip is prepared prior to the step of introducing the castable slip into the casting mold by mixing the Na-β-aluminate- and/or precursor-particles with water and the dispersants and the binders.

8. The method according to claim 7, wherein the mixing of the Na-β-aluminate- and/or precursor-particles with the water as well as the dispersants and the binders is carried out in a mill and that during the mixing the Na-β-aluminate- and/or precursor-particles are simultaneously comminuted.

9. The method according to claim 1, wherein the casting mold comprises 50-99 wt. % of the aggregate particles, wherein the proportion of the inorganic binder is up to 50 wt. % and the proportion of the organic binder is up to 20 wt. %.

10. The method according to claim 1, wherein the dwell time of the castable slip in the casting mold is between 5 and 20 minutes and/or in that the castable slip is pressurized during dwelling in the casting mold.

11. The method according to claim 1, wherein the sinterable green body is dried after expiry of a dwell time in the casting mold or after demolding thereof.

12. The method according to claim 1, wherein the sinterable green body is a hollow body closed on one side.

13. A method for manufacturing a ceramic molded body from sintered sodium-β-aluminate-particles, comprising manufacturing the sinterable green body according to claim 1 and firing the sinterable green body.

14. A method for manufacturing a sodium-high-temperature-battery comprising manufacturing the ceramic molded body according to claim 13 and using said ceramic molded body as a ceramic electrolyte within said sodium-high-temperature-battery.

15. The method according claim 1, wherein the castable slip comprises 50-85 wt. % of the Na-β-aluminate- and/or precursor-particles, 25-45 wt. % of water and up to 20 wt. % of other constituents in the form of the dispersants, organic binders, and optionally further auxiliaries.

16. The method according to claim 1, wherein the binders in the castable slip comprise (poly) saccharides, PVA, or carboxylic acids.

17. The method according to claim 1, wherein the castable slip is prepared prior to the step of introducing the castable slip into the casting mold by mixing the Na-β-aluminate- and/or precursor-particles with water and the dispersants and the binders, the castable slip being deaerated by applying a vacuum during or after mixing.

18. The method according to claim 1, wherein the casting mold comprises 70-90 wt. % of the aggregate particles, wherein the proportion of the inorganic binder is up to 30 wt. % and the proportion of the organic binder is up to 15 wt. %.

19. The method according to claim 1, wherein the sinterable green body is dried after expiry of a dwell time in the casting mold or after demolding thereof, the drying taking place under normal pressure.

* * * * *